Aug. 7, 1956 E. J. HERBENAR 2,757,989
SHAFT BEARING HANGER
Filed Dec. 24, 1952
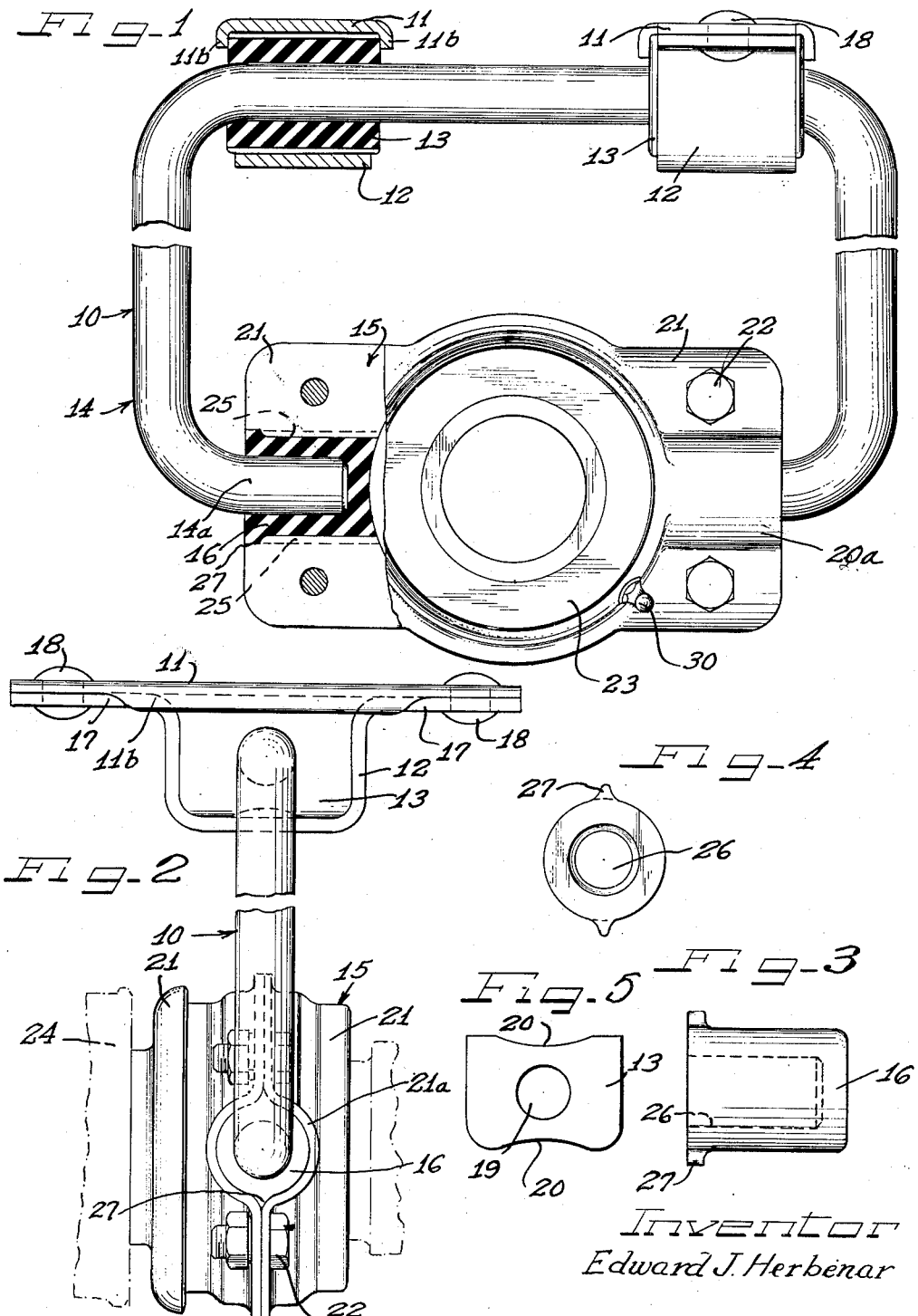
Inventor
Edward J. Herbenar

United States Patent Office 2,757,989
Patented Aug. 7, 1956

2,757,989

SHAFT BEARING HANGER

Edward J. Herbenar, Detroit, Mich., assignor to Thompson Products, Inc., Cleveland, Ohio, a corporation of Ohio Application December 24, 1952, Serial No. 327,759

6 Claims. (Cl. 308—28)

This invention relates to a shaft bearing hanger assembly, and more particularly to an improved hanger assembly construction including rubber bushings at the joints thereof for resiliently supporting a shaft bearing housing and dampening any objectionable vibrations transmitted to said assembly.

In the past, several difficulties have been encountered when supporting a bearing housing on a rigid frame of a carriage or vehicle such as an automotive vehicle.

One of the most important of these difficulties concerns the transmission of vibrations induced in the frame as a result of forces acting upon the bearing housing. For example, in a bearing housing supporting a propeller shaft, vibrations are induced in the bearing housing and transmitted to the bearing support frame. In effect, this action on the supporting frame sets up vibrations in the vehicle which in time seriously weaken it and render it extremely dangerous.

In order that machines or vehicles of the above character operate with maximum efficiency, safety and comfort, it is necessary that these vibrations be dampened or eliminated.

To the end that the difficulty above set forth may be avoided, there is provided herein an improved hanger assembly wherein the joints of the hanger assembly are provided with resilient rubber bushings and wherein the coaction between the particular joints and bushings is such as to dampen or substantially eliminate any induced vibrations that would otherwise be transmitted therethrough.

It is therefore an object of this invention to provide a resilient hanger assembly for the suspension of a propeller shaft bearing housing, in which rubber bushings are provided in the joints between the hanger and the hanger support, and between the hanger and shaft bearing housing, for the purpose of dampening any vibrations caused by external forces acting upon the propeller shaft and to reduce or eliminate any objectionable noise.

It is a further object of this invention to provide a resilient hanger assembly of the type having at the joints thereof rubber bushings or fittings, in which provision is made for relieving stresses, pressures or distortions acting upon the bushings so as to increase or improve the dampening effect upon vibration.

It is a further object of this invention to provide rubber bushings incorporating parts and features constructed in an improved manner, all to the end of affording a simplified, low cost construction which can be readily attached to or detached from a hanger assembly with a minimum of time, effort and skill.

It is a further object of this invention to provide an improved rubber bushing for a joint of a hanger assembly and having structural features affording means for sealing grease inside the hanger joints.

It is a further object of this invention to provide, in the joints of a hanger assembly, rubber bushings in which provision is made for relieving or accommodating distortion of the bushings when they are subjected to external forces, whereby vibrations induced in the hanger assembly are readily dampened and objectionable noises are reduced, if not eliminated.

Other and further important objects of this invention will become apparent from the following description and the appended claims.

On the drawings:

Figure 1 is a front elevational view of a shaft bearing hanger assembly embodying the principles of my invention, with parts broken away and in section;

Figure 2 is a view taken substantially at right angles to the view of Figure 1;

Figure 3 is an enlarged front elevational view of one of the rubber bushings used in the housing shown in Fig. 1;

Figure 4 is an enlarged end elevational view of the rubber bushing shown in Figure 3; and Figure 5 is an end elevational view of one of the rubber bushings used in the hanger shown in Figure 1.

As shown on the drawings:

In Figures 1 and 2, reference numeral 10 indicates a shaft bearing hanger exemplifying the embodiment of the principles of this invention. The hanger itself may, of course, take a variety of forms and has been illustrated simply as being generally C-shaped. For present purposes it may be observed that the hanger may be a part of the chassis or frame of an undercarriage such as that of an automotive vehicle, although it obviously may be applied to other specific forms of vehicles or mechanisms without departing from the concepts of the present invention.

The shaft bearing hanger assembly 10 has been illustrated as comprising metal stampings or straps 11, 12 for retaining upper resilient bushings 13, a swinging bail structure or hanger 14 received in said upper bushings, and a shaft bearing housing 15 having mounted therein lower resilient bushings 16 for pivotally connecting the hanger and bearing housing.

Turning first to the hanger straps 11, 12, the strap 11 is of channel form having depending flanges 11a and 11b for receiving within the bight thereof a generally U-shaped strap 12. The ends 17 of strap 12 are outwardly bent and riveted or bolted, as at 18, to strap 11 and subsequently riveted or bolted to a chassis frame or beam (not shown). These straps define a loop for retaining a resilient hollow bushing 13 which is restrained from lateral movement by the flanges 11a and 11b of strap 11.

Bushing 13 is of rectangular shape and is composed of natural rubber, or a synthetic rubber such as neoprene, and provided with a central longitudinal opening 19 for supportingly engaging hanger 14. Arcuate grooves 20 in the upper and lower faces of the bushing function as relief spaces for absorbing induced vibrations which may be transmitted to the hanger, as will hereinafter appear.

The bearing housing 15 includes a pair of metal stampings or plates 21 bolted together by bolts 22 to house a ball-bearing race or journal 23 and support a stepped rotating shaft 24 freely journaled in the ball bearing race. Each stamping 21 has formed at opposite ends thereof a semi-cylindrical portion 21a, which when the stampings are brought into assembled relation, provide oppositely directed, aligned end sockets. Since the longitudinal edges of the semi-cylindrical portions 21a do not meet the mating surfaces of plates 21 sharply, but rather along curved junctions or fillets, the upper and lower inside walls of these end sockets are provided with clearance or relief spaces 25 for a purpose that will later appear.

The vibrations transmitted through the bearing housing are partially checked and dampened by a pair of bushings 16, which are fitted into the end sockets of the housing. Each bushing 16 is thimble-shaped, that is, closed at one end and open at the other, as at 26. The bushings are composed of oil-resistant rubber, for example neoprene. The bearing housing is lubricated by means of a grease fitting 30. Projections 27 are provided at the outer end of each bushing 16 for filling the outer ends of the sockets to seal and retain lubricant in the bearing housing and to prevent entry of foreign material.

As illustrated in Figure 1, the bail structure or hanger 14 is pivotally anchored in the straps 11, 12 by bushings 13. The hanger comprises a generally C-shaped member having parallel arms, the ends of which present inwardly bent ends 14a. The ends 14a are aligned and adapted to be pivotally received in the aligned openings 26 in bushings 16. In this manner, the hanger pivotally supports shaft bearing housing 15. The bearing housing is permitted to rock about a horizontal axis as well as to absorb such motions of the bearing housing incident to the rotation of the shaft 24.

In operation, the rubber bushings 16 and 13 are designed to absorb induced vibrations transmitted to the shaft hanger assembly as a result of forces acting upon the rotating shaft 24. For this purpose, rubber bushings 16, when subjected to undue pressures, stresses or vibrations, will resiliently yield thereto and tend to fill the clearance or relief spaces 25, thereby improving the dampening effect upon vibration. The amount of relief provided in the shaft bearing housing is, of course, a factor in determining the dampening characteristics of the bushings 16.

In addition, the upper bushings 13 also perform vibration dampening functions. The arcuate grooves 20 in the upper and lower faces of the bushings 13 allow deflection of the rubber of the bushings within the encasing formed by the metal stampings or straps 11, 12, while the resilient material is confined at the outer edges of the straps. The central grooved portions lie in planes including the plane of the hanger 14 in which maximum vibration would tend to occur, and therefore aid in dampening such vibration.

The hardness of the resilient material is also a determining factor in the amount of relief required. In this situation, by making the bushings 13 and and 16 of different degrees of hardness, as for example making bushing 13 of a durometer hardness of 40 and bushing 16 of a durometer hardness of 50, or vice versa, the vibration frequency induced by the shaft rotating within the bearing housing can be brought within a tolerance range which has the least effect on the machine or vehicle concerned.

From the above description it may be seen that this invention includes lower resilient mountings 16 which function as pivotal connections having vibration dampening properties. The clearance spaces 25 afforded by the metal stampings 21 of the shaft bearing housing increase the dampening effect toward the transmission of vibrations through the rubber to the supporting hanger. In addition, the upper mounting is also capable of functioning to improve vibration dampening characteristics of the hanger assembly by virtue of the shape of the resilient material, i. e., the upper and lower grooves or relief area 20.

It will be understood that modifications and variations may be effected without departing from the scope of the novel concepts of the present invention.

I claim as my invention:

1. In a hanger assembly for a rotating shaft, including a swingable bail structure and a shaft bearing housing supporting said shaft, a resilient connection between said bail and housing comprising a pair of aligned sockets at opposite ends of said housing, a resilient bushing in each of said sockets and adapted to supportingly engage said bail, there being clearance spaces provided in each of said sockets between said sockets and said bushings in the plane of said bail, and grease seal means on each of said bushings, whereby said clearance spaces accommodate distortion of said bushings to thereby aid in dampening vibrations induced by said rotating shaft, and said grease seal means serve to retain lubricant within the bearing housing.

2. In a hanger assembly for a rotating shaft, including a bail structure and a shaft bearing housing pivotally suspended thereby, a pair of metal straps, and a resilient mounting confined by said straps and having an opening therethrough receiving said bail structure, both said straps and mounting having non-conforming adjacent surfaces spaced to provide clearance spaces therebetween centrally of the plane of said bail structure for increasing the dampening characteristics of the mounting.

3. In a hanger assembly for a rotating shaft including a bail structure and a shaft bearing housing pivotally depending therefrom, a pair of rigid members, a resilient mounting encased within said pair of rigid members and having an opening therethrough receiving said bail structure, and grooves in said mounting extending at least substantially co-extensively with respect to the portion of said bail structure received through the mounting to provide clearance spaces between said rigid members and said mounting lying in the plane of said bail structure for increasing the dampening characteristics of the mounting.

4. In a hanger assembly including supporting straps, a swingable bail structure, and a shaft bearing housing supported thereby, a resilient mounting encased by said straps and having an opening therethrough receiving said bail structure, a pair of end sockets in said housing, a resilient material disposed in each of said sockets and having a recess therein to supportingly engage said bail structure, said mounting and sockets being so constructed and arranged as to provide clearance spaces between said straps and mounting and between said sockets and material therein, said clearance spaces lying in the plane of said bail structure for dampening vibrations induced by forces acting upon said bearing housing and transmitted through said hanger assembly.

5. In a hanger assembly for a rotating shaft including a bail structure and a shaft bearing housing pivotally depending therefrom, a pair of rigid members, a resilient mounting encased within said pair of rigid members and having an opening therethrough receiving said bail structure, said resilient mounting being provided on both its surfaces adjacent said rigid members with grooves parallel to each other and to said opening and extending along the entire length of engagement of said surfaces with said rigid members to provide clearance spaces between said rigid members and said mounting lying in the plane of said bail structure for increasing the dampening characteristics of the mounting.

6. In a hanger assembly including supporting means providing a generally cylindrical socket having axially extending recesses along opposite portions thereof, a generally cylindrical resilient bushing received in said socket and provided with an opening axially extending from an end thereof adapted to supportingly receive an associated support member, the end of said bushing opposite said opening extending across said opening and closing the same, said bushing on its peripheral surface adjacent the bushing end from which said opening extends being provided with outward projections each sealing a respective one of said recesses of said supporting means.

References Cited in the file of this patent

UNITED STATES PATENTS

| 1,093,735 | Shapiro | Apr. 21, 1914 |
| 1,163,898 | Droitcour | Dec. 14, 1915 |
| 1,808,365 | Masury | June 2, 1931 |
| 1,901,026 | Giordano | Mar. 14, 1933 |
| 2,304,595 | Prentice | Dec. 8, 1942 |
| 2,450,279 | Guy | Sept. 28, 1948 |
| 2,580,119 | Meyers | Dec. 25, 1951 |
| 2,739,851 | Herbenar | Mar. 27, 1956 |

FOREIGN PATENTS

| 581,541 | Great Britain | Oct. 16, 1946 |